(12) United States Patent
Ren et al.

(10) Patent No.: US 6,859,333 B1
(45) Date of Patent: Feb. 22, 2005

(54) ADAPTIVE LIQUID CRYSTAL LENSES

(75) Inventors: Hongwen Ren, Orlando, FL (US); Yun-Hsing Fan, Ovledo, FL (US); Shin-Tson Wu, Ovledo, FL (US)

(73) Assignee: Research Foundation of the University of Central Florida, Orlando, FL (US)

( * ) Notice: Subject to any disclaimer, the term of this patent is extended or adjusted under 35 U.S.C. 154(b) by 0 days.

(21) Appl. No.: 10/765,356

(22) Filed: Jan. 27, 2004

(51) Int. Cl.[7] ............................. G02B 3/10; G02B 3/12; G02B 15/14
(52) U.S. Cl. ...................... 359/721; 359/666; 359/676; 359/824
(58) Field of Search ................................. 359/721, 666, 359/676, 824, 814, 665, 667; 351/41, 49, 158; 349/13

(56) References Cited

U.S. PATENT DOCUMENTS

| | | | |
|---|---|---|---|
| 4,190,330 A | 2/1980 | Berreman | ............. 350/331 |
| 4,904,063 A | 2/1990 | Okada et al. | ........... 350/347 V |
| 5,047,847 A | 9/1991 | Toda et al. | .................. 358/98 |
| 5,124,836 A | 6/1992 | Kikuchi | ...................... 359/422 |
| 5,150,234 A | 9/1992 | Takahashi et al. | ............ 359/65 |
| 6,359,674 B1 | 3/2002 | Horiuchi | ..................... 349/200 |
| 6,437,925 B1 | 8/2002 | Nishioka | .................... 359/726 |
| 6,512,563 B1 | 1/2003 | Tajima | ...................... 349/123 |
| 2003/0052838 A1 * | 3/2003 | Kim et al. | .................... 345/32 |
| 2004/0070843 A1 * | 4/2004 | Nishioka et al. | ............ 359/676 |

* cited by examiner

Primary Examiner—Timothy Thompson
(74) Attorney, Agent, or Firm—Brian S. Steinberger; Law Offices of Brian S. Steinberger, P.A.

(57) ABSTRACT

An adaptive optical lens device, system and method of using the same is composed of at least two planar substrates and at least one homogeneous nematic liquid crystal (LC) layer. One planar substrate has a spherical or annular ring-shaped Fresnel grooved transparent electrode within it, the other has a transparent electrode coated on its inner surface. The thickness of the LC layer is uniform. When a voltage is applied across the LC layer, a centro-symmetrical gradient distribution of refractive index within LC layer will occur. Therefore, the LC layer causes light to focus. By controlling the applied voltage, the focal length of the lens is continuously tunable.

29 Claims, 4 Drawing Sheets

ADAPTIVE LIQUID CRYSTAL LENSES

This invention relates to an adaptive optical lens system, in particular to an adaptive liquid crystal lens, device, system and method for making the same wherein the focal length of the lens is continuously tunable.

BACKGROUND AND PRIOR ART

A large birefringence and a low control voltage distinguish nematic liquid crystals (LCs) from other electro-optical materials. For a lens based on LC materials, a voltage is employed traditionally to vary its focus. Much of the past work on adaptive nematic LC lenses has focused on the lens structure, the focal length of the lens and the ability to tune the lens. One of the fundamental parameters describing a lens is its focal length. For virtually all lenses, the focal length is a static parameter, which means that, once the lens is constructed, the focal length is set. For a variable focal length to be obtained, usually a group of lenses, having separation distances between the lenses, is adjusted mechanically. Adjustments accomplished with mechanical movement are inherently bulky and inefficient. In comparison to a lens that has only one focal length, the tunable LC lens provides a very important optical element. Acting as a group of lenses, an adaptive LC lens is compact, lightweight, efficient and low cost. Therefore, it is desirable to have continuously tunable, adaptive nematic LC lenses, as disclosed in the present invention.

One type of prior art adaptive nematic LC lens has a non-uniform or inhomogeneous LC layer, as discussed below. Bricot et al. in U.S. Pat. No. 4,037,929 describe a kind of LC lens consisting of a plano element and a convex element between which the LC is stored. Both the inner surfaces of the planar element and the convex element are coated with a transparent electrode. As taught by Bricot et al., the applied voltage can change the LC refractive index. Upon changing the refractive index of the LC material, the focal length of the lens can be tuned within a narrow range because of the inherent surface profile. Due to the non-uniform LC cell gap, LC alignment along the inner convex surface becomes worse; thus, light is scattered by the LC layer.

Berreman in U.S. Pat. No. 4,190,330, Okada et al. in U.S. Pat. No. 4,795,248, Toda et al. in U.S. Pat. No. 5,047,847, and Takahashi et al. in U.S. Pat. No. 5,150,234 each disclose a similar LC lens structure wherein the substrate surface or the LC gap layer presents a convex or concave profile. Okada et al. in U.S. Pat. No. 4,904,063, disclose a Fresnel lens; the inner surface of one substrate is formed by a number of annular ring-shaped Fresnel grooves with their crests leveled for more rapid response time. Kikuchi in U.S. Pat. No. 5,124,836 and Nishioka in U.S. Pat. No. 6,437,925 each disclose a variable focal length lens with the added element of a mirror to compensate for the curved LC layer or substrate surface.

Another type of LC lens is one wherein the LC layer is uniform or homogeneous, but with different electrode patterns. Kowel in U.S. Pat. No. 4,572,616 describes a LC lens with a homogeneous LC layer but with a series of independently linear transparent control electrodes to make the lens tunable. The demerits of this kind of lens are that the operating technique is complicated, and there is light diffraction due to the grating-like electrode. Tajima in U.S. Pat. No. 6,191,881, U.S. Pat. No. 6,512,563 and Hamada et al. in U.S. Pat. No. 6,577,434 describe a lens structure similar to that of Kowel in U.S. Pat. No. 4,572,616, but made with Fresnel zone structures.

The lens device of the present invention is fabricated with planar LC layers and planar substrates, but curved electrodes. The curved electrodes can be convex, concave, spherical or annular ring-shaped grooves, as in a Fresnel lens. LC lens with the structures outlined above can be switched with uniform optical response due to a homogeneous cell gap; no light scattering due to homogeneous alignment, and the focal length of the novel lens device can be tuned from infinity to a desired definite range.

SUMMARY OF THE INVENTION

The first objective of the present invention is to provide an improvement device, system and method of making adaptive lenses.

The second objective of the present invention is to provide a liquid crystal lens device wherein the focal length of the lens can be tuned from infinity to some distance, or from one focal length to another focal length.

The third objective of the present invention is to produce an adaptive nematic LC device capable of providing a sharp, clean image.

The fourth objective of the present invention is to provide a method for making a variety of adaptive lenses, such as positive lens, polarizaton independent lens, negative lens and Fresnel lens that are continuously tunable.

The fifth objective of the present invention is to provide a lens with homogeneous response time due to the homogeneous cell gap.

Further objects and advantages of this invention will be apparent from the following detailed description of a presently preferred embodiment that is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The fabrication of a variety of adaptive nematic LC lens is described in detail below, beginning with the fabrication of a positive lens. Someone skilled in the art can easily perform the fabrication process for the different types of lenses.

EXAMPLE 1

Positive Lens (Method 1)

Figure 1:
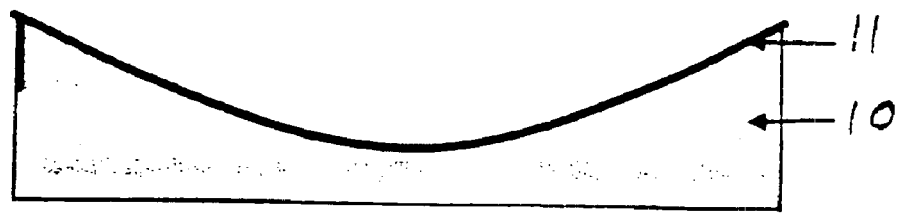
FIG. 1A shows the concave surface of a positive lens coated with a transparent electrode.
FIG. 1B shows the concave valley of a positive lens filled with the same material of the lens or polymer to form a planar substrate.
FIG. 1C shows two planar substrates forming a cell containing a homogeneous liquid crystal alignment layer.
Figure 1B:
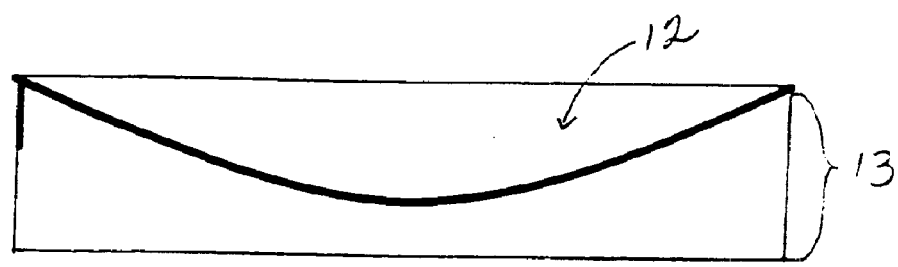
Figure 1C:
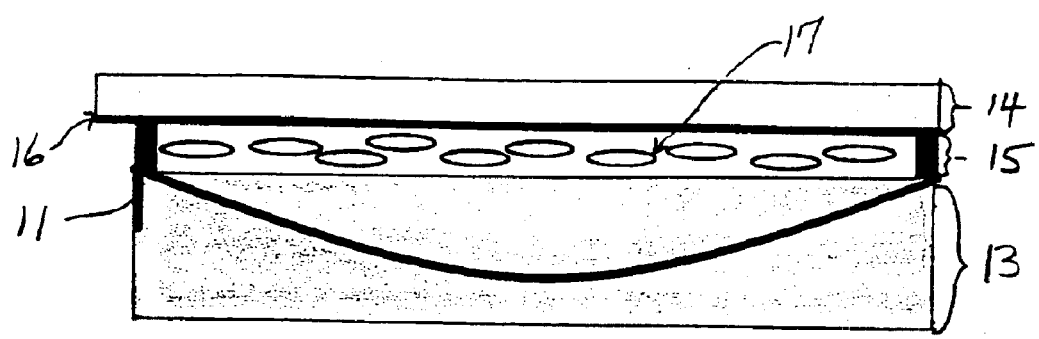

FIGS. 1A–1C show the fabrication process for a positive lens. The concave surface of a lens 10 is coated with a transparent electrode 11, such as, indium-tin-oxide (ITO), as shown in FIG. 1A. Then, the concave valley 12 is filled with the same material of the lens or polymer to form a planar substrate 13, as shown in FIG. 1B. Depending upon the refractive index of the glass or polymer substrate, many types of transparent materials, such as UV curable pre-polymer NOA65, NOA81 available from Norland Optical Adhesives, Edmund Industrial Optics, 101 East Gloucester Pike, Barrington N.J., 08007-1380, NOA65: L36-426, NOA81: L 36-428 or thermal cured polymer, or other similar materials can be chosen.

After filling the concave valley with transparent material, the planar substrate 13 is combined with another planar substrate 14 to confine the liquid crystal (LC) layer 15. The inner surface of substrate 14 is also coated with a transparent electrode 16. Both inner surfaces of the two planar substrates 13 and 14, which face the LC cell, are coated with alignment layers (not shown). Alignment layers are used on the surface of the planar substrates adjacent to the liquid crystal material to produce homogeneous alignment. Persons skilled in the art may select from a wide variety of materials, usually polyimides, including, but not limited to polyvinyl alcohol (PVA) for use as an alignment layer on the planar substrate. When LC material is injected into the cell, a homogeneous LC alignment layer 17 is formed, as shown in FIG. 1C.

Thus, one fabrication process of a tunable positive LC lens uses a curved or spherical electrode 11 embedded in one substrate 13 and a flat electrode 16 on another substrate 14. When a voltage is applied across the LC layer, the electric field will produce a centro-symmetrical gradient distribution of refractive index within the LC layer.

Figure 2:
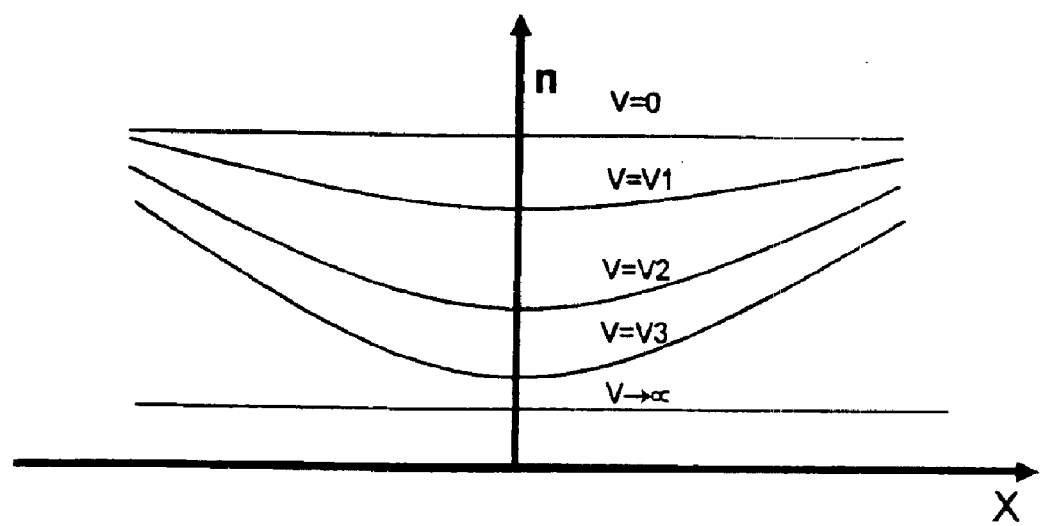
FIG. 2 shows the refractive index profile change across the LC cell with different applied voltage.

FIG. 2 shows an exemplary voltage-dependent gradient refractive index profile across the pixel. Therefore, the LC layer causes light to focus when a suitable voltage is applied across the cell. In FIG. 2, n represents the refractive index of the LC material; X represents the position and $V_1$, $V_2$, $V_3$ and $V \rightarrow \infty$ are the applied voltages for tuning the focal length of the lens. At V=0, the LC layers are uniform; thus, the focusing effect does not occur. As the applied voltage increases gradually, the non-uniform electric field causes different degrees of reorientation to the LC directors. As a result, the gradient refractive index profile is formed. The incident light is therefore focused. If the applied voltage is much higher than the threshold voltage of the LC material, then all the LC directors will be aligned perpendicular to the substrates. Under such a condition, the gradient refractive index is erased and the focusing effect vanishes.

EXAMPLE 2

Positive Lens (Method 2)

Figure 3:
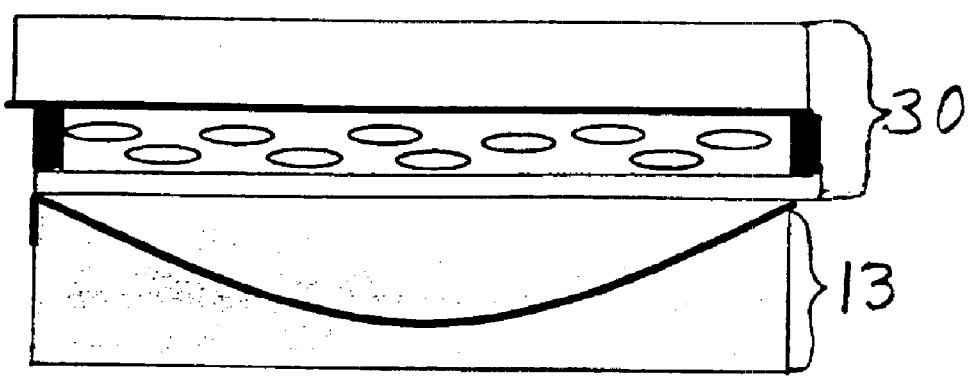
FIG. 3 is a planar substrate with spherical electrode and a homogeneous LC cell.

To simplify the lens fabrication processes, one can use a planar substrate 13 as shown in FIG. 1B to combine with a prepared LC cell 30, as shown in FIG. 3. Thus, to form a positive lens, a planar substrate having a concave lens surface with curved or concave electrode is positioned below the homogeneous nematic LC cell.

EXAMPLE 3

Polarization Independent Positive LC Lens

Figure 4:
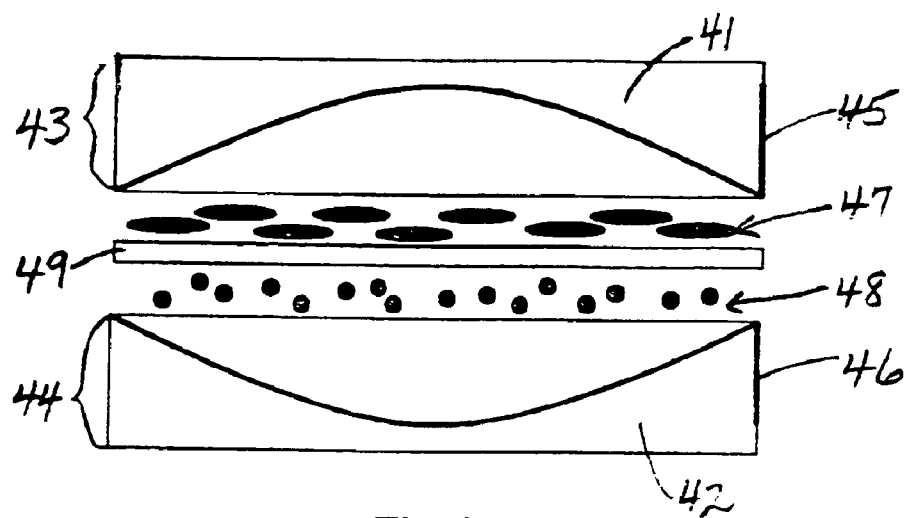
FIG. 4 is a polarization-independent positive LC lens, using double concave lens, planar substrates with two spherical electrode layers.

Using two concave lenses 41 and 42, and the similar fabrication processes as shown in FIG. 1, a first planar substrate 43, and a second planar substrate 44, are placed in a parallel arrangement with each having a spherical electrode layer 45 and 46, as shown in FIG. 4. The first and second planar substrates comprise spherical or curved electrodes positioned to form a concave mirror image. Two homogeneous LC layers 47 and 48 in orthogonal alignment are positioned between the first and second planar substrates. If the top LC layer 47 causes the extraordinary ray to change focus, then the bottom LC layer 48 will change the focus of the ordinary ray. Thus, this kind of lens is polarization independent. It is highly desirable to have polarization independent lens. Otherwise, the lens needs to use a linear polarizer, which would reduce the transparency of the lens by at least 50%. There is a middle substrate 49 made of transparent material, as shown in FIG. 4. Due to the uniform thickness of the middle substrate 49, the converging ray induced by the top LC layer 47 and bottom LC layer 48, respectively, may not superimpose at the same focal point, resulting in a different focus for different polarization. To avoid this situation, the focal length of the top and bottom layers should be independently controlled so that the focusing behavior of the lens does not depend on the side from which light enters.

EXAMPLE 4

Negative Lens

Figure 5:
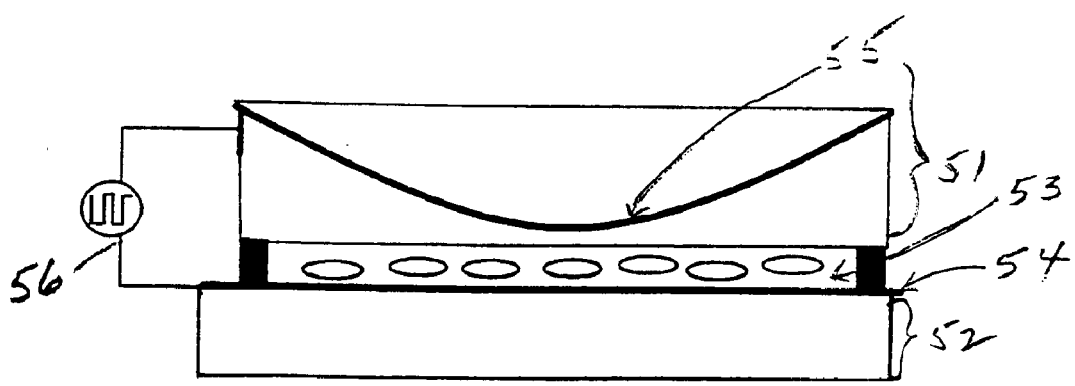
FIG. 5 shows the structure of a negative LC lens.

FIG. 5 is an illustration of how to make a negative lens, using a parallel arrangement of planar substrates 51 and 52, a homogeneous LC cell 53, a flat electrode 54 and a spherical electrode 55. When the first planar substrate 51, is positioned above the homogeneous nematic LC cell 53, a negative adaptive LC lens is formed. The electric field in the middle is stronger than that of the edges. As a result, the refractive index in the central part is smaller than that of the outer rings. The device functions as a negative lens in the voltage-on state. When the voltage is off, the device does not diverge light.

EXAMPLE 5

Polarization Independent Negative LC Lens

Figure 6:
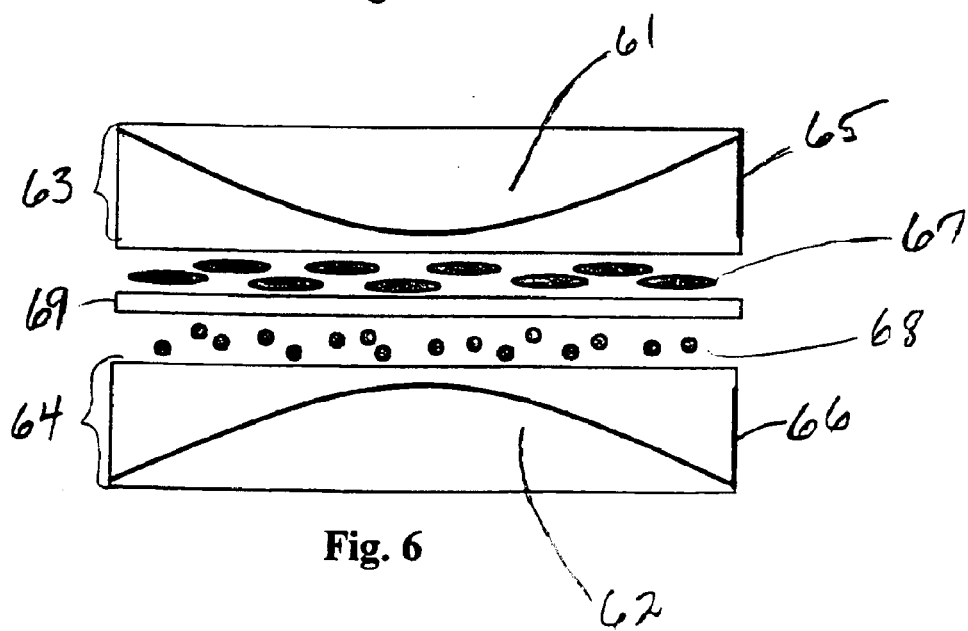
FIG. 6 is a polarization-independent negative LC lens, using double convex lens, planar substrates with two spherical electrode layers.

Using the similar principle depicted in FIG. 4, it is possible to make a polarization independent negative lens. Instead of the two concave lenses 41 and 42 used in FIG. 4, the polarization independent negative lens comprises two convex lenses 61 and 62. The lens structure shown in FIG. 6 consists of a first planar substrate 63, and a second planar substrate 64, with a spherical electrode layer 65 and 66 in each substrate. The first and second planar substrates are in parallel alignment and the spherical or curved electrodes are positioned to form a convex mirror image. Two LC layers 67 and 68 are aligned at orthogonal directions and positioned between the first and second planar substrates. The middle substrate 69 separates the two LC layers. The topside of transparent substrate 69 that is adjacent to the LC layer 67 has the same alignment layer as that of substrate 63 so that the LC layer 67 has a homogeneous alignment. The bottom side of substrate 69 has the same alignment direction as that of substrate 64 so that the bottom LC layer 68 also has a homogeneous alignment. The two homogeneous LC layers 67 and 68 are orthogonal. If the top LC layer 67 works as a negative lens for the extraordinary ray, then the bottom LC layer 68 works for the ordinary ray. Thus, the device is independent of the polarization of the incident light.

EXAMPLE 6

Fresnel Lens

Figure 7:
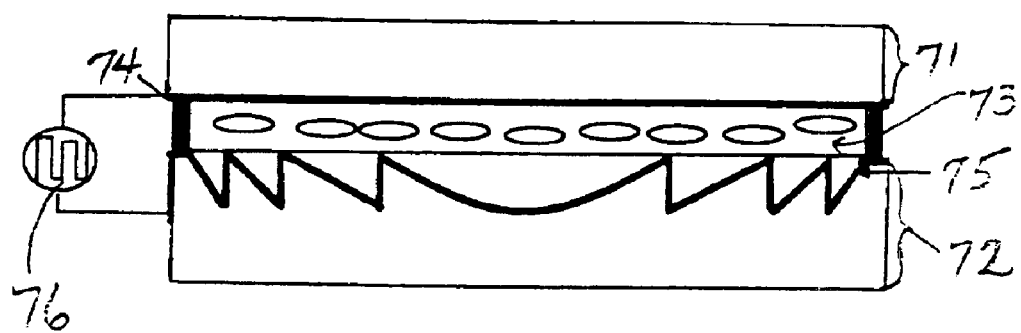
FIG. 7 is a cross-sectional view of a tunable LC Fresnel lens.

An annular ring-shaped Fresnel grooved transparent electrode can be used, as shown in FIG. 7, instead of the spherical or concave electrode shown in FIG. 1. The device fabrication processes are similar to those described in FIG. 1. Two planar substrates 71 and 72 are aligned in a parallel arrangement and combined to form a cell for the containment of a liquid crystal 73. The preferred liquid crystal of the present invention is a homogeneous nematic liquid crystal. One planar substrate contains a flat electrode 74 while the other planar substrate contains a curved electrode such as an annular-ring Fresnel grooved electrode 75. Because of the Fresnel grooved structure, the operating voltage can be reduced significantly.

In the fabrication of the adaptive LC lens, a means for applying voltage is attached to the electrodes imbedded in each planar substrate as shown in FIGS. 5 and 7. In FIG. 5, the means for applying voltage is identified as 56 and in FIG. 7; the means for applying voltage is 76. It is understood that a voltage means is attached to each lens constructed such that the operable lenses can be continuously tuned by controlling the applied voltage. When voltage is applied across the homogeneous nematic LC layer, a sharp and clear image is obtained. A judicious selection of voltage is important and dependent on the selection of a curved electrode, the glass or polymeric material used in the planar substrate, and is not a limitation of the present invention.

The major advantages of the adaptive LC lens of the present invention can be summarized as follows. First, its focal length can be tuned in a large range. Second, its fabrication process is uncomplicated so that the cost is low. Third, it can be scaled to any size. Fourth, no light scattering occurs because of the uniform cell gap and homogeneous LC alignment. Fifth, no light diffraction occurs due to a single spherical concave or convex electrode.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for making an adaptive liquid crystal lens system that is continuously tunable, comprising the steps of:
    (a) aligning a first planar substrate and a second planar substrate in a parallel arrangement;
    (b) implanting a curved electrode in the first planar substrate;
    (c) implanting a flat electrode in the second planar substrate;
    (d) connecting voltage to the curved electrode and the flat electrode;
    (e) combining the first planar substrate with the second planar substrate to form a cell for containment of a liquid crystal;
    (f) inserting a homogeneous nematic liquid crystal (LC) layer into the cell between the planar substrates;
    (g) applying voltage across the homogeneous LC layer;
    (h) controlling the applied voltage, thereby allowing the focal length of the lens to be continuously tunable.

2. The method of claim 1, wherein the first planar substrate has a concave lens surface and a concave valley.

3. The method of claim 2, wherein the concave lens surface is coated with a transparent electrode.

4. The method of claim 3, wherein the transparent electrode is indium tin oxide (ITO).

5. The method of claim 2, wherein the concave valley is filled with a transparent material to form a planar substrate.

6. The method of claim 5, wherein the transparent material is selected from a glass or polymeric material.

7. The method of claim 2, wherein the first planar substrate having a concave lens surface with curved electrode is positioned below the homogeneous nematic LC cell to form a positive adaptive LC lens.

8. The method of claim 2, wherein the first planar substrate having a concave lens surface with curved electrode is positioned above the homogeneous nematic LC cell to form a negative adaptive LC lens.

9. The method of claim 1, wherein the curved electrode in the first planar substrate is annular ring-shaped Fresnel grooved.

10. The method of claim 9, wherein the annular ring-shaped Fresnel grooved electrode is filled with a transparent material to form a planar substrate.

11. The method of claim 10, wherein the transparent material is selected from a glass or polymeric material.

12. The method of claim 1, wherein the flat electrode in the second substrate is replaced by a curved electrode having the same shape as the curved electrode in the first planar substrate.

13. The method of claim 12, wherein the first planar substrate with curved electrode and the second planar substrate with curved electrode are in parallel alignment on opposite sides of an arrangement of a first homogeneous LC layer and a second homogeneous LC layer separated by a transparent material of uniform thickness.

14. The method of claim 13, wherein the first and second homogeneous liquid crystal layers are in orthogonal alignment and the curved electrode in each planar substrate is positioned to form a concave mirror image.

15. The method of claim 14, wherein a polarization independent positive lens is formed.

16. The method of claim 13, wherein the first and second homogeneous liquid crystal layers are in orthogonal alignment and the curved electrode in each planar substrate is positioned to form a convex mirror image.

17. The method of claim 16, wherein a polarization independent negative lens is formed.

18. An adaptive liquid crystal lens system made by the method of claim 1.

19. An adaptive liquid crystal lens system made by the method of
    (a) aligning a first planar substrate and a homogeneous LC cell having a second planar substrate including a flat electrode, in a parallel arrangement;
    (b) implanting a curved electrode in the first planar substrate;
    (c) connecting voltage to the curved electrode and the flat electrode;
    (d) combining the first planar substrate with the homogeneous LC cell to form a continuously tunable positive lens when voltage is applied across the homogeneous LC cell.

20. The adaptive LC lens system of claim 19, wherein the first planar substrate has a concave lens surface and a concave valley.

21. The adaptive LC lens system of claim 20, wherein the concave lens surface is coated with a transparent electrode.

22. The adaptive LC lens system of claim 21, wherein the transparent electrode is indium tin oxide (ITO).

23. The adaptive LC lens system of claim 20, wherein the concave valley is filled with a transparent material to form a planar substrate.

24. The adaptive LC lens system of claim 23, wherein the transparent material is selected from a glass or polymeric material.

25. A continuously tunable, adaptive liquid crystal lens system comprising:

a curved electrode in combination with at least one homogeneous nematic liquid crystal (LC) layer wherein the lens system is used.

26. The continuously tunable, adaptive liquid crystal lens system of claim 25, wherein the curved electrode is concave.

27. The continuously tunable, adaptive liquid crystal lens system of claim 25, wherein the curved electrode is convex.

28. The continuously tunable, adaptive liquid crystal lens system of claim 25, wherein the curved electrode is annular ring-shaped Fresnel grooved.

29. A method of continuously tuning an adaptive liquid crystal lens system, comprising the steps of (a) aligning a curved electrode directly to a curved lens;

(b) applying a voltage;

(c) continuously tuning the system by controlling the applied voltage.

* * * * *

UNITED STATES PATENT AND TRADEMARK OFFICE
CERTIFICATE OF CORRECTION

| | | |
|---|---|---|
| PATENT NO. | : 6,859,333 B1 | Page 1 of 1 |
| APPLICATION NO. | : 10/765356 | |
| DATED | : February 22, 2005 | |
| INVENTOR(S) | : Hongwen Ren | |

It is certified that error appears in the above-identified patent and that said Letters Patent is hereby corrected as shown below:

Col. 1, line 7 insert

--STATEMENT REGARDING FEDERALLY SPONSORED RESEARCH OR DEVELOPMENT

This subject invention was made with government support under DARPA, federal contract number DAAD 19-02-1-0208. The government has certain rights in this invention.--

Signed and Sealed this
Twenty-second Day of February, 2011

David J. Kappos
*Director of the United States Patent and Trademark Office*